(12) United States Patent
Wu et al.

(10) Patent No.: US 12,528,873 B2
(45) Date of Patent: Jan. 20, 2026

(54) HUMANIZED BCMA ANTIBODY AND BCMA-CAR-T CELLS

(71) Applicants: ProMab Biotechnologies, Inc., Richmond, CA (US); Forevertek Biotechnology Co., Ltd, Changsha (CN)

(72) Inventors: Lijun Wu, Berkeley, CA (US); Vita Golubovskaya, Pinole, CA (US)

(73) Assignees: ProMab Biotechnologies, Inc., Richmond, CA (US); Forevertek Biotechnology Co., Ltd, Changsha (CN)

( * ) Notice: Subject to any disclaimer, the term of this patent is extended or adjusted under 35 U.S.C. 154(b) by 438 days.

(21) Appl. No.: 18/041,612

(22) PCT Filed: Aug. 13, 2021

(86) PCT No.: PCT/US2021/046012
§ 371 (c)(1),
(2) Date: Feb. 14, 2023

(87) PCT Pub. No.: WO2022/040050
PCT Pub. Date: Feb. 24, 2022

(65) Prior Publication Data
US 2023/0303708 A1  Sep. 28, 2023

Related U.S. Application Data

(60) Provisional application No. 63/067,011, filed on Aug. 18, 2020.

(51) Int. Cl.
| | |
|---|---|
| *C07K 16/28* | (2006.01) |
| *A61K 40/11* | (2025.01) |
| *A61K 40/31* | (2025.01) |
| *A61K 40/42* | (2025.01) |
| *C07K 14/725* | (2006.01) |
| *C12N 5/0783* | (2010.01) |

(52) U.S. Cl.
CPC .......... *C07K 16/2878* (2013.01); *A61K 40/11* (2025.01); *A61K 40/31* (2025.01); *A61K 40/4215* (2025.01); *C07K 14/7051* (2013.01); *C12N 5/0636* (2013.01); *C12N 5/0646* (2013.01); *A61K 2239/31* (2023.05); *A61K 2239/38* (2023.05); *A61K 2239/46* (2023.05); *C07K 2317/622* (2013.01); *C07K 2319/03* (2013.01)

(58) Field of Classification Search
CPC ............ C07K 16/2878; C07K 14/7051; C07K 2317/622; C07K 2319/03; C07K 2317/24; C07K 14/70521; C07K 14/70517; C07K 2317/56; C07K 2319/02; C07K 2319/33; C07K 2319/74; A61K 40/11; A61K 40/31; A61K 40/4215; A61K 2239/31; A61K 2239/38; A61K 2239/46; C12N 5/0636; C12N 5/0646; C12N 2740/16043; C12N 2510/00; C12N 15/86; C12N 2740/15043; C12N 2800/107; A61P 35/00
See application file for complete search history.

(56) References Cited

U.S. PATENT DOCUMENTS

| | | |
|---|---|---|
| 2017/0051068 A1 | 2/2017 | Pillarisetti et al. |
| 2018/0258177 A1 | 9/2018 | Kwon et al. |
| 2020/0190163 A1 | 6/2020 | Wu et al. |

FOREIGN PATENT DOCUMENTS

| | | |
|---|---|---|
| WO | 2019195017 A1 | 10/2019 |
| WO | 2020087054 A1 | 4/2020 |
| WO | 2020150339 A1 | 7/2020 |

OTHER PUBLICATIONS

International Search Report dated Dec. 14, 2021 cited in PCT/US2021/046012, 4 pages.
European Search Report dated Jul. 24, 2024 cited in EP Application No. 21858876.2, 3 pages.

*Primary Examiner* — Chun W Dahle
*Assistant Examiner* — Grace H Lunde
(74) *Attorney, Agent, or Firm* — Perkins Coie LLP; Viola Kung

(57) ABSTRACT

The present invention is directed to a humanized BCMA single-chain variable fragment (scFv), comprising $V_H$ having the amino acid sequence of SEQ ID NO: 4 and $V_L$ having the amino acid sequence of SEQ ID NO: 5. The present invention is also directed to a BCMA chimeric antigen receptor fusion protein comprising from N-terminus to C-terminus: (i) a single-chain variable fragment (scFv) of the present invention, (ii) a transmembrane domain, (iii) at least one co-stimulatory domains, and (iv) an activating domain. A preferred co-stimulatory domain is CD28 or 41-BB. The humanized BCMA-CAR-T cells have specific killing activity with secretion of cytokine IFN-gamma in CAR-T cells in vitro and in vivo.

11 Claims, 12 Drawing Sheets
Specification includes a Sequence Listing.

```
         10          20          30          40          50
MLQMAGQCSQ  NEYFDSLLHA  CIPCQLRCSS  NTPPLTCQRY  CNASVTNSVK
         60          70          80          90         100
GTNAILWTCL  GLSLIISLAV  FVLMFLLRKI  NSEPLKDEFK  NTGSGLLGMA
        110         120         130         140         150
NIDLEKSRTG  DEIILPRGLE  YTVEECTCED  CIKSKPKVDS  DHCFPLPAME
        160         170         180
EGATILVTTK  TNDYCKSLPA  ALSATEIEKS  ISAR
```

Humanized BCMA ScFv-CD28-CD3ζ

EF1 pr

Humanized BCMA ScFv-CD28-CD3ζ

MNDU3 pr

HUMANIZED BCMA ANTIBODY AND BCMA-CAR-T CELLS

This application is a national stage of International Application PCT/US2021/046012, filed Aug. 13, 2021, which claims the priority of U.S. Provisional Application No. 63/067,011, filed Aug. 18, 2020. The contents of the above-identified applications are incorporated herein by reference in their entireties.

REFERENCE TO SEQUENCE LISTING, TABLE OR COMPUTER PROGRAM

The Sequence Listing is concurrently submitted herewith with the specification as an ASCII formatted text file via EFS-Web with a file name of SequenceListing.txt with a creation date of Aug. 13, 2021, and a size of 27 kilobytes. The Sequence Listing filed via EFS-Web is part of the specification and is hereby incorporated in its entirety by reference herein. The instant application contains a Sequence Listing which has been submitted electronically in ASCII format and is hereby incorporated by reference in its entirety. Said ASCII copy, generated on Feb. 14, 2023, is named 18041612_1_1.TXT, and is 21,851 bytes in size.

FIELD OF THE INVENTION

The present invention relates to humanized BCMA antibody and humanized BCMA-CAR-T Cells (PMC309 with CD28 domain and PMC750 with 41BB domain) specifically decreasing multiple myeloma tumor growth, which are useful in the field of adoptive immunity gene therapy for tumors.

BACKGROUND OF THE INVENTION

Immunotherapy is emerging as a highly promising approach for the treatment of cancer. T cells or T lymphocytes, the armed forces of our immune system, constantly look for foreign antigens and discriminate abnormal (cancer or infected cells) from normal cells. Genetically modifying T cells with CAR (Chimeric antigen receptor) constructs is the most common approach to design tumor-specific T cells. CAR-T cells targeting tumor-associated antigens (TAA) can be infused into patients (called adoptive cell transfer or ACT) representing an efficient immunotherapy approach [1, 2]. The advantage of CAR-T technology compared with chemotherapy or antibody is that reprogrammed engineered T cells can proliferate and persist in the patient ("a living drug") [1, 2].

CARs typically consist of a monoclonal antibody-derived single-chain variable fragment (scFv) at the N-terminal part, hinge, transmembrane domain and a number of intracellular co-activation domains: (i) CD28, (ii) CD137 (4-1BB), CD27, or other co-stimulatory domains, in tandem with an activation CD3-zeta domain. (FIG. 1) [2, 3]. The evolution of CARs went from first generation (with no co-stimulation domains) to second generation (with one costimulation domain) to third generation CAR (with several co-stimulation domains). Generating CARs with two costimulatory domains (the so-called $3^{rd}$ generation CAR) have led to increased cytolytic CAR-T cell activity, improved persistence of CAR-T cells leading to its augmented antitumor activity.

BCMA

B cell maturation antigen (BCMA) is a cell surface receptor, also known as CD269 and tumor necrosis factor receptor superfamily member 17 (TNFRSF17), that is encoded by TNFRSF17 gene. This receptor is expressed mainly in mature B lymphocytes and in most cases overexpressed in multiple myeloma (MM) [4]. Current therapies to target BCMA in MM include monoclonal antibodies, bi-specific antibodies and T cellular immunotherapies, CAR-T therapies [4],[5].

BCMA Structure and Signaling

The human BCMA protein consists of 184 amino-acids: 1-54-extracellular domain; 55-77-transmembrane domain; 78-184-cytoplasmic domain. The amino-acid sequence of BCMA is shown on FIG. 2. BCMA lacks signaling peptide and resembles other receptors BAFF Receptor and transmembrane activator and cyclophilin ligand interactor and calcium modulator (TACI) [5]. These receptors play major role in B cell maturation and differentiation into plasma cells. Their ligands include BAFF and APRIL which expression is increase in MM patients [5]. Monoclonal antibodies target receptor-ligand interactions, and CAR-T cell therapy binds BCMA and kill MM cells. BCMA also interacts with TRAF1,2,3,5 and 6.

BRIEF DESCRIPTION OF THE DRAWINGS

FIG. 4A: CHO-BCMA target cells. FIG. 4B: CHO target cells. From top to bottom on the right, Mock CAR-T cells, Humanized BCMA CAR-T cells, T cells and target cells are shown as effector cells.

DETAILED DESCRIPTION OF THE INVENTION

Definitions

Figures 1, 2:
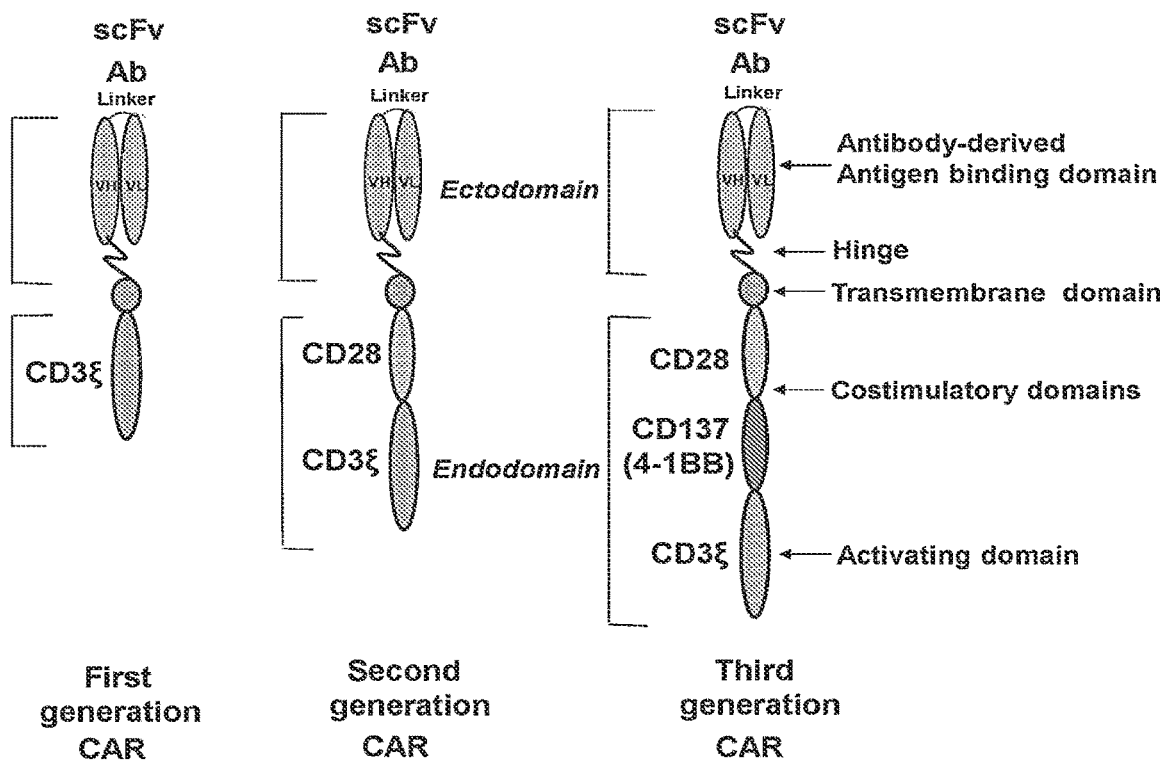
FIG. 1. The structures of CAR. The left panel shows the structure of first generation (no co-stimulatory domains). The middle panel shows the structure of the second generation (one co-stimulatory domain CD28 or 4-BB). The right panel shows the third generation of CAR (two or more co-stimulatory domains). [3]
FIG. 2. The amino-acid sequence of BCMA protein (SEQ ID NO: 1). Extracellular domain is underlined.

As used herein, a "chimeric antigen receptor (CAR)" is a receptor protein that has been engineered to give T cells the new ability to target a specific protein. The receptor is chimeric because they combine both antigen-binding and T-cell activating functions into a single receptor. CAR is a fused protein comprising an extracellular domain capable of binding to an antigen, a transmembrane domain, and at least one intracellular domain. The "chimeric antigen receptor (CAR)" is sometimes called a "chimeric receptor", a "T-body", or a "chimeric immune receptor (CIR)." The "extracellular domain capable of binding to an antigen" means any oligopeptide or polypeptide that can bind to a certain antigen. The "intracellular domain" means any oligopeptide or polypeptide known to function as a domain that transmits a signal to cause activation or inhibition of a biological process in a cell.

As used herein, a "domain" means one region in a polypeptide which is folded into a particular structure independently of other regions.

As used herein, "humanized antibodies" are antibodies from non-human species whose protein sequences have been modified to increase their similarity to antibody variants produced naturally in humans.

As used herein, a "single chain variable fragment (scFv)" means a single chain polypeptide derived from an antibody which retains the ability to bind to an antigen. An example of the scFv includes an antibody polypeptide which is formed by a recombinant DNA technique and in which Fv regions of immunoglobulin heavy chain (H chain) and light chain (L chain) fragments are linked via a spacer sequence. Various methods for engineering an scFv are known to a person skilled in the art.

As used herein, a "tumor antigen" means a biological molecule having antigenicity, expression of which causes cancer.

The inventors have engineered humanized BCMA scFv starting from heavy and light chain variable regions of a mouse monoclonal antibody, clone 4C8A (WO2019/195017). Mouse 4C8A antibody exhibits strong and selective binding to human BCMA. Humanized BCMA antibody of the present invention also exhibits strong and selective binding to human BCMA, but with less immunogenicity to human.

The inventors have generated CAR-T cells based on humanized BCMA ScFv sequence specifically targeting BCMA. The inventors have produced humanized BCMA-CAR-T cells to target cancer cells overexpressing BCMA tumor antigen. The humanized BCMA-CAR-T cells of the present invention secreted high level of cytokines against multiple myeloma cancer cells and killed CHO-BCMA-positive target cells but not control CHO cells.

The present invention is directed to a humanized monoclonal anti-human BCMA antibody or an antigen-binding fragment thereof (e.g., Fab, (Fab)$_2$, scFv), comprising humanized VH having the amino acid of SEQ ID NO: 4 and humanized VL having the amino acid of SEQ ID NO: 5, respectively. In one embodiment, the humanized anti-human BCMA antibody is a single-chain variable fragment (scFv). The scFv can be $V_H$-linker-$V_L$ or $V_L$-linker-$V_H$.

The present invention is also directed to a chimeric antigen receptor fusion protein comprising from N-terminus to C-terminus: (i) a single-chain variable fragment (scFv) against BCMA (the present invention), (ii) a transmembrane domain, (iii) at least one co-stimulatory domains, and (iv) an activating domain.

Figure 3:
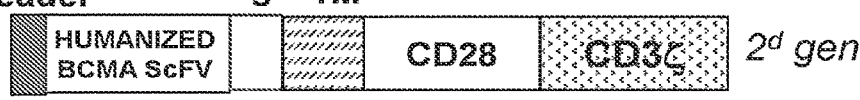
FIG. 3. The structure of humanized BCMA CAR construct. The second generation BCMA-CAR has either CD28 as a co-stimulatory domain under EF1-promoter (upper panel, e.g., CAR-PMC309), or 41BB as a co-stimulatory domain under MNDU3 promoter (lower panel, e.g., CAR-PMC750).
Figure 3:

In some embodiments, humanized BCMA CAR structures are shown in FIG. 3.

In one embodiment, the co-stimulatory domain is selected from the group consisting of CD28, 4-1BB, GITR, ICOS-1, CD27, OX-40 and DAP10 domains. A preferred the co-stimulatory domain is CD28 or 4-1BB.

A preferred activating domain is CD3-zeta (CD3 Z or CD3ζ).

The transmembrane domain may be derived from a natural polypeptide, or may be artificially designed. The transmembrane domain derived from a natural polypeptide can be obtained from any membrane-binding or transmembrane protein. For example, a transmembrane domain of a T cell receptor α or βαchain, a CD3 zeta chain, CD28, CD3ε, CD45, CD4, CD5, CD8, CD9, CD16, CD22, CD33, CD37, CD64, CD80, CD86, CD134, CD137, ICOS, CD154, or a GITR can be used. The artificially designed transmembrane domain is a polypeptide mainly comprising hydrophobic residues such as leucine and valine. It is preferable that a triplet of phenylalanine, tryptophan and valine is found at each end of the synthetic transmembrane domain. Optionally, a short oligopeptide linker or a polypeptide linker, for example, a linker having a length of 2 to 10 amino acids can be arranged between the transmembrane domain and the intracellular domain. In one embodiment, a linker sequence having a glycine-serine continuous sequence can be used.

The present invention provides a nucleic acid encoding the BCMA-CAR. The nucleic acid encoding the CAR can be prepared from an amino acid sequence of the specified CAR by a conventional method. A base sequence encoding an amino acid sequence can be obtained from the NCBI RefSeq IDs or accession numbers of GenBank for an amino acid sequence of each domain, and the nucleic acid of the present invention can be prepared using a standard molecular biological and/or chemical procedure. For example, based on the base sequence, a nucleic acid can be synthesized, and the nucleic acid of the present invention can be prepared by combining DNA fragments which are obtained from a cDNA library using a polymerase chain reaction (PCR).

A nucleic acid encoding the CAR of the present invention can be inserted into a vector, and the vector can be introduced into a cell. For example, a virus vector such as a retrovirus vector (including an oncoretrovirus vector, a lentivirus vector, and a pseudo type vector), an adenovirus vector, an adeno-associated virus (AAV) vector, a simian virus vector, a vaccinia virus vector or a Sendai virus vector, an Epstein-Barr virus (EBV) vector, and a HSV vector can be used. A virus vector lacking the replicating ability so as not to self-replicate in an infected cell is preferably used.

For example, when a retrovirus vector is used, a suitable packaging cell based on a LTR sequence and a packaging signal sequence possessed by the vector can be selected for preparing a retrovirus particle using the packaging cell. Examples of the packaging cell include PG13 (ATCC CRL-10686), PA317 (ATCC CRL-9078), GP+E-86 and GP+envAm-12, and Psi-Crip. A retrovirus particle can also be prepared using a 293 cell or a 293T cell having high transfection efficiency. Many kinds of retrovirus vectors produced based on retroviruses and packaging cells that can be used for packaging of the retrovirus vectors are widely commercially available from many companies.

A CAR-T cell binds to a specific antigen via the CAR, thereby a signal is transmitted into the cell, and as a result, the cell is activated. The activation of the cell expressing the CAR is varied depending on the kind of a host cell and an intracellular domain of the CAR, and can be confirmed based on, for example, release of a cytokine, improvement of a cell proliferation rate, change in a cell surface molecule, or the like as an index. For example, release of a cytotoxic cytokine (a tumor necrosis factor, lymphotoxin, etc.) from the activated cell causes destruction of a target cell expressing an antigen. In addition, release of a cytokine or change in a cell surface molecule stimulates other immune cells, for example, a B cell, a dendritic cell, a NK cell, and a macrophage.

The cell expressing the CAR can be used as a therapeutic agent for a disease. The therapeutic agent comprises the cell expressing the CAR as an active ingredient, and it may further comprise a suitable excipient.

The inventors have generated humanized BCMA-ScFv-CD28/41-BB-CD3-CAR-T (BCMA-CAR-T) cells against multiple myeloma cells (MM). BCMA-CAR-T cells of the present invention secrete high levels of cytokines. BCMA-CAR-T cells are positive by LDH cytotoxicity assay and by cytotoxicity assay with CHO-BCMA cells but not by CHO cells, which indicates specific killing activity of CAR-T cells against target cancer cells with their cytotoxic activity against tumor or viral antigens.

The advantages of the humanized BCMA -ScFv of the present invention include less immunogenicity to humans because it has human sequences in ScFv, Thus, the BCMA antibody of the present invention is highly potent and advantageous as therapeutic agents in many clinical applications.

The present humanized BCMA ScFv can be used for immunotherapy applications: toxin/drug-conjugated antibody, monoclonal therapeutic antibody, humanization of BCMA antibody, and CAR-T cell immunotherapy.

Humanized BCMA-CAR-T cells using the present humanized BCMA ScFv can be effectively used to target BCMA antigen in BCMA-positive cancer cell lines.

Humanized BCMA-CAR-T cells can be used in combination with different chemotherapy: checkpoint inhibitors; targeted therapies, small molecule inhibitors, antibodies.

Humanized BCMA-CAR-T cells can be used clinically for BCMA-positive cancer cells.

Modifications of co-activation domains: CD28, 4-1BB and others can be used to increase its efficacy. Tag-conjugated humanized BCMA scFv can be used for CAR generation.

Humanized BCMA-CAR-T cells can be used with different safety switches: t-EGFR, RQR (Rituximab-CD34-Rituximab) and other.

Third generation CAR-T or other co-activation signaling domains can be used for the same humanized BCMA-scFv inside CAR.

The humanized BCMA CAR can be combined with CARs targeting other tumor antigens or tumor microenvironment, e.g., VEGFR-1-3, PDL-1, bi-specific antibodies with BCMA and CD3 or other antigens can be generated for therapy.

The humanized BCMA-CAR-T cells can be used against cancer stem cells that are most resistant against chemotherapy and form aggressive tumors.

Humanized BCMA ScFv or humanized BCMA $V_H$ and $V_L$ can be used for generation of BCMA bispecific antibodies with another antibody (for example, CD3 ScFv).

The following examples further illustrate the present invention. These examples are intended merely to be illustrative of the present invention and are not to be construed as being limiting.

EXAMPLES

The inventors generated humanized BCMA-ScFv-CAR construct (CAR-PMC309) under EF1 promoter inside lentiviral vector cloned into lentiviral vector. Lentiviral CAR construct contains the humanized BCMA ScFv-CD28-CD3zeta insert—between the Xba I and Eco RI cloning sites. The inventors also generated BCMA-ScFv-41BB-CD3 construct (CAR-PMC750) with CAR under MNDU3 promoter for higher expression of humanized BCMA-CAR (FIG. 3).

The lentiviruses were generated in 293T cells and titer was established by RT-PCR. Then equal dose of lentiviruses was used for transduction of T cells.

Materials and Methods

Example 1. Lentiviral CAR Construct

The codon optimized sequence of humanized BCMA ScFv was synthesized in IDT as a Gblock, and sub-cloned into second generation CAR sequence with either CD28 or 4-1BB costimulatory domains and CD3 activation domain. Mock CAR-T cells with extracellular TF tag-CD28-CD3 CAR-T cells were used as Mock CAR-T cells.

Example 2. Lentivirus Generation $2.5 \times 10^7$ HEK293FT cells (Thermo Fisher) were seeded on 0.01% gelatin-coated 15 cm plates and cultured overnight in DMEM, 2% FBS, 1×pen/strep. The cells were transfected with 10 µg of the CAR lentiviral vector and the pPACKH1 Lentivector Packaging mix (System Biosciences, Palo Alto, CA) using the NanoFect transfection NF100 agent (Alstem). The next day the medium was replaced with fresh medium, and after 48 hours the medium with lentiviral particles was collected. The medium was cleared of cell debris by centrifugation at 2100 g for 30 min. The virus particles were concentrated by ultracentrifugation at 112,000 g for 60 min at 4° C. using a SW28.1 rotor, resuspended in serum-free DMEM medium, and frozen in several aliquot vials at −80° C.

Example 3. CAR-T Cells

PBMC were suspended at $1 \times 10^6$ cells/ml in AIM V-AlbuMAX medium (Thermo Fisher) containing 10% FBS and 10 ng/ml IL-2 (Thermo Fisher) and activated by mixing with an equal number of CD3/CD28 Dynabeads (Thermo Fisher) in non-treated 24-well plates (0.5 ml per well). At 24 and 48 hours, lentivirus was added to the cultures at a multiplicity of infection (MOI) of 5-10. The T and CAR-T cells proliferated over 10-12 days with medium changed every 3 days to maintain the cell density at $1\text{-}2 \times 10^6$ cells/ml.

Example 4. Flow Cytometry (FACS)

First, 0.25 million cells were suspended in 100 µl of buffer (PBS containing 2 mM EDTA pH 8 and 0.5% BSA) and incubated on ice with 1 µl of human serum for 10 min. The diluted primary antibody was used with cells for 30 min at 4° C., and then after washing the biotin-conjugated goat anti-mouse F(ab)'$_2$ was added with CD3-allophycocyanin (APC)-conjugated mouse anti-human CD3 antibody and PE-conjugated streptavidin at 1:100 dilution and incubated for 30 min at 4° C. The cells were rinsed with 3 ml of washing buffer, then stained for 10 min with 7-AAD, suspended in the FACS buffer and analyzed on a FACS Calibur (BD Biosciences). Cells were gated first for light scatter versus 7-AAD staining, then the 7-AAD—live gated cells were plotted for anti-CD3 staining versus CAR+staining with anti-(Fab)$_2$ antibodies.

Example 5. Real Time Cytotoxicity Assay (RTCA)

Adherent target cells (1×10$^4$ cells per well) were seeded into 96-well E-plates (Acea Biosciences, San Diego, CA) using the impedance-based real-time cell analysis (RTCA) xCELLigence system (Acea Biosciences). The next day, the medium was removed and replaced with AIM V-AlbuMAX medium containing 10% FBS ±1×10$^5$ effector cells in triplicate (CAR-T cells or non-transduced T cells). The cells were monitored for another 24-48 hours with the RTCA system, and impedance was plotted over time. Cytolysis was calculated as (impedance of target cells without effector cells minus impedance of target cells with effector cells)×100 /impedance of target cells without effector cells.

Example 6. IFN-gamma Secretion Assay

Non-adherent target cells were cultured with the effector cells (CAR-T cells or non-transduced T cells) at a 1:1 ratio (1×10$^4$ cells each) in U-bottom 96-well plates with 200 µl of AIM V-AlbuMAX medium containing 10% FBS, in triplicate. After 16 hours, the top 150 µl of medium was transferred to V-bottom 96-well plates and centrifuged at 300 g for 5 min to pellet any residual cells. The top 120 µl of supernatant was transferred to a new 96-well plate and analyzed by ELISA for human IFN-γ levels using a kit from R&D Systems (Minneapolis, MN) according to the manufacturer's protocol. The supernatant after RTCA with adherent target cells was collected and analyzed as above.

Example 7. NSG Mouse Tumor Xenograft Model and Imaging

Six-weeks old male NSG mice (Jackson Laboratories, Bar Harbor, ME) were housed in accordance with the Institutional Animal Care and Use Committee (IACUC). Each mouse was injected subcutaneously on day 0 with 100 µl of 1.5×10$^6$ MM1S-luciferase positive cells in sterile serum free medium. Next day 1×10$^7$ CAR-T cells in serum-free medium were injected intravenously. Imaging was done after luciferin injection using Xenogen Ivis System. Quantification was done by measuring bioluminescence (BLI) in photons/sec signals. Kaplan-Myer survival curve was plotted with GraphPad Prism software based on mice survival data.

Example 8. Statistical Analysis

Data were analyzed with Prism software (GraphPad, San Diego, CA). Comparisons between two groups were performed by unpaired Student's t-test; comparisons between multiple groups were done with one or two-way ANOVA followed by Sidak or Dunnett's tests. The p-value <0.05 was considered significant.

Sequences

Example 9. Humanized BCMA VH, VL and scFv SEQUENCES

The BCMA scFv was obtained by sequencing hybridoma clones positive for BCMA. The structure of humanized BCMA (PMC309) scFv is: VH-linker-VL.

The nucleotide sequence of humanized BCMA PMC309 ScFv is shown below: V$_H$ is bolded; V$_L$ is underlined, in between linker is italicized.

```
caggtgcagctggtgcagagcggcgcggaagtgaaaaaac
cgggcagcagcgtgaaagtgagctgcaaagcgagcggcta
tacctttaccagctatgtgatgcattgggtgcgccaggcg
ccgggccagggcctggaatggatgggctatattattccgt
ataacgatgcgaccaaatataacgaaaaatttaaaggccg
cgtgaccattaccgcggataaaagcaccagcaccgcgtat
atggaactgagcagcctgcgcagcgaagataccgcggtgt
attattgcgcgcgctataactatgatggctattttgatgt
gtggggccagggcaccctggtgaccgtgagcagcggcggc
ggcggcagcggcggcggcggcagcggcggcggcggcagcg
atgtggtgatgacccagagcccggcgtttctgagcgtgac
cccgggcgaaaaagtgaccattacctgccgcgcgagccag
agcattagcgattatctgcattggtatcagcagaaaccgg
atcaggcgccgaaactgctgattaaatatgcgagccagag
cattagcggcgtgccgagccgctttagcggcagcggcagc
ggcaccgatttttacctttaccattagcagcctggaagcgg
aagatgcggcgacctattattgccagaacggccatagctt
tccgccgacctttggcggcggcaccaaagtggaaattaaa
(SEQ ID NO: 2)
```

Humanized BCMA (PMC309) scFv, amino acid sequence is shown below (SEQ ID NO: 3)
QVQLVQSGAEVKKPGSSVKVSCKASGYTFTSYVMHWVRQA

PGQGLEWMGYIIPYNDATKYNEKFKGRVTITADKSTSTAY

MELSSLRSEDTAVYYCARYNYDGYFDVWGQGTLVTVSSGG

GGSGGGGSGGGGSDVVMTQSPAFLSVTPGEKVTITCRASQ

SISDYLHWYQQKPDQAPKLLIKYASQSISGVPSRFSGSGS

GTDFTFTISSLEAEDAATYYCQNGHSFPPTFGGGTKVEIK

BCMA (PMC309), V$_H$, amino acid sequence (SEQ ID NO: 4):
VQLVQSGAEVKKPGSSVKVSCKASGYTFTSYVMHWVRQA

PGQGLEWMGYIIPYNDATKYNEKFKGRVTITADKSTSTAY

MELSSLRSEDTAVYYCARYNYDGYFDVWGQGTLVTVSS

BCMA (PMC309) V$_L$, amino acid sequence (SEQ ID NO: 5):
DVVMTQSPAFLSVTPGEKVTITCRASQSISDYLHWYQQKP

DQAPKLLIKYASQSISGVPSRFSGSGSGTDFTFTISSLEA

EDAATYYCONGHSFPPTFGGGTKVEIK

The linker amino sequence is shown below (SEQ ID NO: 6)
GGGGSGGGGSGGGGS

Example 10A. Humanized BCMA-CAR Sequences (CAR-PMC309)

The scheme of Humanized (PMC309) BCMA-CAR construct is shown on FIG. 3. Lentiviral vector with EF1a promoter was used for cloning of humanized scFv CAR sequences.

The following nucleotide sequence shows human CD8 signaling peptide, humanized BCMA scFv (VH-Linker-VL), CD8 hinge, CD28 transmembrane, co-stimulating domain CD 28, activation domain CD3 zeta (FIG. 3, upper panel).

```
<CD8 leader>
Nucleotide sequence,
                                       SEQ ID NO: 7
ATGGCCTTACCAGTGACCGCCTTGCTCCTGCCGCTGG

CCTTGCTGCTCCACGCCGCCAGGCCG

Amino acid sequence,
                                       SEQ ID NO: 8
MALPVTALLLPLALLLHAARP <Nhe I site>
Nucleotide sequence
gctagc Amino Acid Sequence
AS <Humanized BCMA (PMC309) scFv>
See Example 9.

<XhoI restriction site>
Nucleotide sequence
CTCGAG

Amino acid sequence
LE

<CD8 hinge>
Nucleotide sequence,
                                       SEQ ID NO: 9
AAGCCCACCACGACGCCAGCGCCGCGACCACCAACAC

CGGCGCCCACCATCGCGTCGCAGCCCCTGTCCCTGCG

CCCAGAGGCGAGCCGGCCAGCGGCGGGGGGCGCAGTG

CACACGAGGGGGCTGGACTTCGCCAGTGAT

Amino acid sequence,
                                       SEQ ID NO: 10
KPTTTPAPRPPTPAPTIASQPLSLRPEASRPAAGGAV

HTRGLDFASD

<Spacer>
Nucleotide sequence
aagccc

Amino Acid sequence
KP

<CD28 TM/co-stimulating>
Nucleotide sequence,
                                       SEQ ID NO: 11
TTTTGGGTGCTGGTGGTGGTTGGTGGAGTCCTGGCTT

GCTATAGCTTGCTAGTAACAGTGGCCTTTATTATTTT

CTGGGTGAGGAGTAAGAGGAGCAGGCTCCTGCACAGT

GACTACATGAACATGACTCCCCGCCGCCCCGGGCCCA

CCCGCAAGCATTACCAGCCCTATGCCCCACCACGCGA

CTTCGCAGCCTATCGCTCC

Amino acid sequence,
                                       SEQ ID NO: 12
FWVLVVVGGVLACYSLLVTVAFIIFWVRSKRSRLLHS

DYMNMTPRRPGPTRKHYQPYAPPRDFAAYRS

<CD3 zeta>
Nucleotide sequence,
                                       SEQ ID NO: 13
AGAGTGAAGTTCAGCAGGAGCGCAGACGCCCCCGCGT

ACCAGCAGGGCCAGAACCAGCTCTATAACGAGCTCAA

TCTAGGACGAAGAGAGGAGTACGATGTTTTGGACAAG

AGACGTGGCCGGGACCCTGAGATGGGGGGAAAGCCGC

AGAGAAGGAAGAACCCTCAGGAAGGCCTGTACAATGA

ACTGCAGAAAGATAAGATGGCGGAGGCCTACAGTGAG

ATTGGGATGAAAGGCGAGCGCCGGAGGGGCAAGGGGC

ACGATGGCCTTTACCAGGGTCTCAGTACAGCCACCAA

GGACACCTACGACGCCCTTCACATGCAGGCCCTGCCC

CCTCGCTAAtag

Amino acid sequence,
                                       SEQ ID NO: 14
RVKFSRSADAPAYQQGQNQLYNELNLGRREEYDVLDK

RRGRDPEMGGKPQRRKNPQEGLYNELQKDKMAEAYSE

IGMKGERRRGKGHDGLYQGLSTATKDTYDALHMQALP

PR

<EcoRI restriction site>
gaattc

Nucleotide sequence of humanized
BCMA-CAR protein (CAR-PMC309),
                                       SEQ ID NO: 15
atggccttaccagtgaccgccttgctcctgccgctggc cttgctgctccacgccgccaggccggctagccaggtg cagctggtgcagagcggcgcggaagtgaaaaaaccgg gcagcagcgtgaaagtgagctgcaaagcgagcggcta tacctttaccagctatgtgatgcattgggtgcgccag gcgccgggccagggcctggaatggatgggctatatta ttccgtataacgatgcgaccaaatataacgaaaaatt taaaggccggcgctataactatgatggctattttgat gtgtgggccagggcaccctggtgaccgtgagcagcg gcggcggcggcagcggcggcggcggcagcggcggcgg cggcagcgatgtggtgatgacccagagcccggcgttt ctgagcgtgaccccgggcgaaaaagtgaccattacct gccgcgcgagccagagcattagcgattatctgcattg gtatcagcagaaaccggatcaggcgccgaaactgctg attaaatatgcgagccagagcattagcggcgtgccga gccgctttagcggcagcggcagcggcaccgatttta

```

```
ctttaccattagcagcctggaagcggaagatgcggcg acctattattgccagaacggccatagctttccgccga cctttggcggcggcaccaaagtggaaattaaactcga gaagcccaccacgacgccagcgccgcgaccaccaaca ccggcgccaccatcgcgtcgcagcccctgtccctgc gcccagaggcgagccggccagcggcgggggcgcagt gcacacgaggggctggacttcgccagtgataagccc ttttgggtgctggtggtggttggtggagtcctggctt gctatagcttgctagtaacagtggcctttattatttt ctgggtgaggagtaagaggagcaggctcctgcacagt gactacatgaacatgactcccgccgcccgggccca cccgcaagcattaccagccctatgccccaccacgcga cttcgcagcctatcgctccagagtgaagttcagcagg agcgcagacgcccccgcgtaccagcagggccagaacc agctctataacgagctcaatctaggacgaagagagga gtacgatgttttggacaagagacgtggccgggaccct gagatgggggaaagccgcagagaaggaagaaccctc aggaaggcctgtacaatgaactgcagaaagataagat ggcggaggcctacagtgagattgggatgaaaggcgag cgccggaggggcaaggggcacgatggcctttaccagg gtctcagtacagccaccaaggacacctacgacgccct tcacatgcaggccctgccccctcgctaa Amino acid sequence of humanized
BCMA-CAR protein (CAR-PMC309),
                                 SEQ ID NO: 16
MALPVTALLLPLALLLHAARPASQVQLVQSGAEVKKP

GSSVKVSCKASGYTFTSYVMHWVRQAPGQGLEWMGYI

IPYNDATKYNEKFKGRVTITADKSTSTAYMELSSLRS

EDTAVYYCARYNYDGYFDVWGQGTLVTVSSGGGGSGG

GGSGGGGSDVVMTQSPAFLSVTPGEKVTITCRASQSI

SDYLHWYQQKPDQAPKLLIKYASQSISGVPSRFSGSG

SGTDFTFTISSLEAEDAATYYCQNGHSFPPTFGGGTK

VEIKLEKPTTTPAPRPPTPAPTIASQPLSLRPEASRP

AAGGAVHTRGLDFASDKPFWVLVVVGGVLACYSLLVT

VAFIIFWVRSKRSRLLHSDYMNMTPRRPGPTRKHYQP

YAPPRDFAAYRSRVKFSRSADAPAYQQGQNQLYNELN

LGRREEYDVLDKRRGRDPEMGGKPQRRKNPQEGLYNE

LQKDKMAEAYSEIGMKGERRRGKGHDGLYQGLSTATK

DTYDALHMQALPPR

Example 10B.
Humanized BCMA-CAR Sequences (CAR-PMC750)
Another CAR was prepared similar to the
protocols of Example 2A with the same scFv,
except with 41BB domain as a stimulating
domain inside lentiviral vector with Kan
resistance gene (FIG. 3, lower panel,
CAR-PMC750).
The amino-acid sequence of hBCMA-41BB-CD3
CAR (CAR-PMC750) is shown below as SEQ
ID NO: 17, with 41BB shown bold.
MALPVTALLLPLALLLHAARPASQVQLVQSGAEVKKP

GSSVKVSCKASGYTFTSYVMHWVRQAPGQGLEWMGYI

IPYNDATKYNEKFKGRVTITADKSTSTAYMELSSLRS

EDTAVYYCARYNYDGYFDVWGQGTLVTVSSGGGGSGG

GGSGGGGSDVVMTQSPAFLSVTPGEKVTITCRASQSI

SDYLHWYQQKPDQAPKLLIKYASQSISGVPSRFSGSG

SGTDFTFTISSLEAEDAATYYCQNGHSFPPTFGGGTK

VEIKLEKPTTTPAPRPPTPAPTIASQPLSLRPEASRP

AAGGAVHTRGLDFASDKPFWVLVVVGGVLACYSLLVT

VAFIIFWVKRGRKKLLYIFKQPFMRPVQTTQEEDGCS

CRFPEEEEGGCELRVKFSRSADAPAYQQGQNQLYNEL

NLGRREEYDVLDKRRGRDPEMGGKPQRRKNPQEGLYN

ELQKDKMAEAYSEIGMKGERRRGKGHDGLYQGLSTAT

KDTYDALHMQALPPR
```

Results

Example 11. Humanized BCMA-CAR-T Cells Killed CHO-BCMA Cells but not CHO Cells.

Figure 4A:
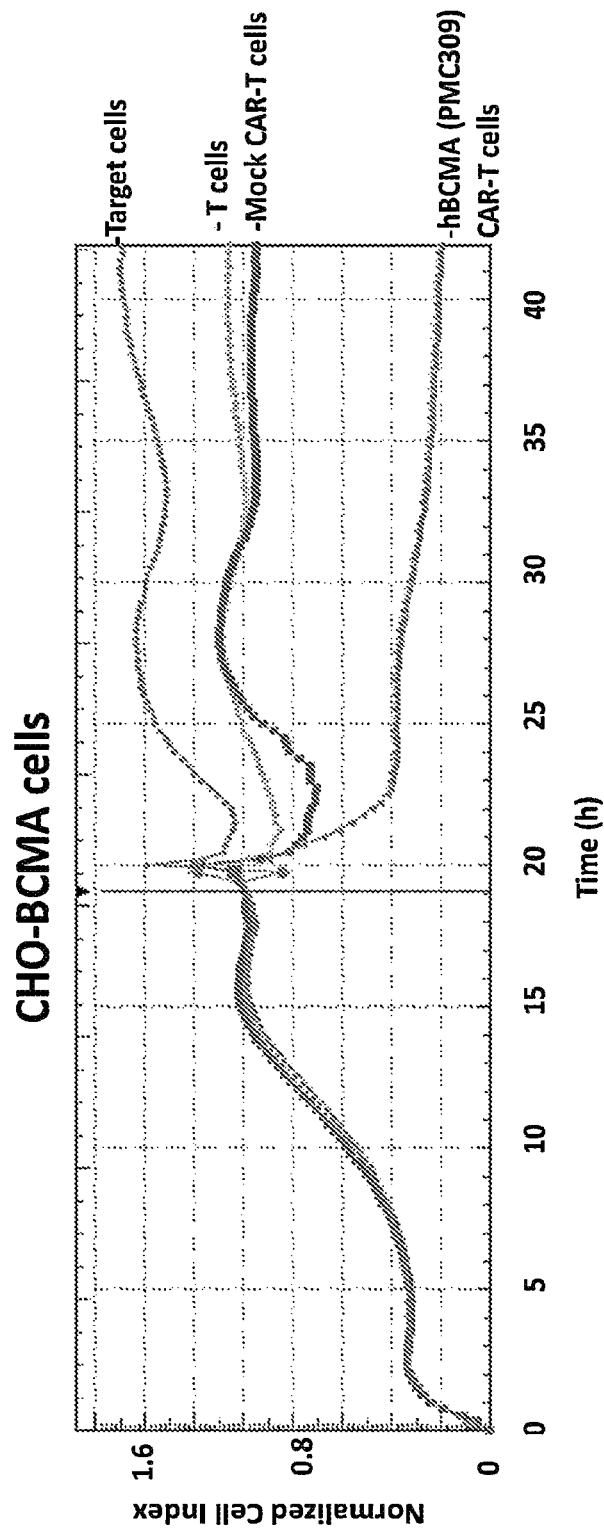
FIGS. 4A-4B. Humanized BCMA-CAR-T cells killed CHO-BCMA cells but not CHO cells. XCelligence Real-time cytotoxicity assay was used for detection of humanized BCMA-CAR-T cell cytotoxicity. Normalized cell index is shown on Y-axis, and time is shown on X-axis.
Figure 4B:
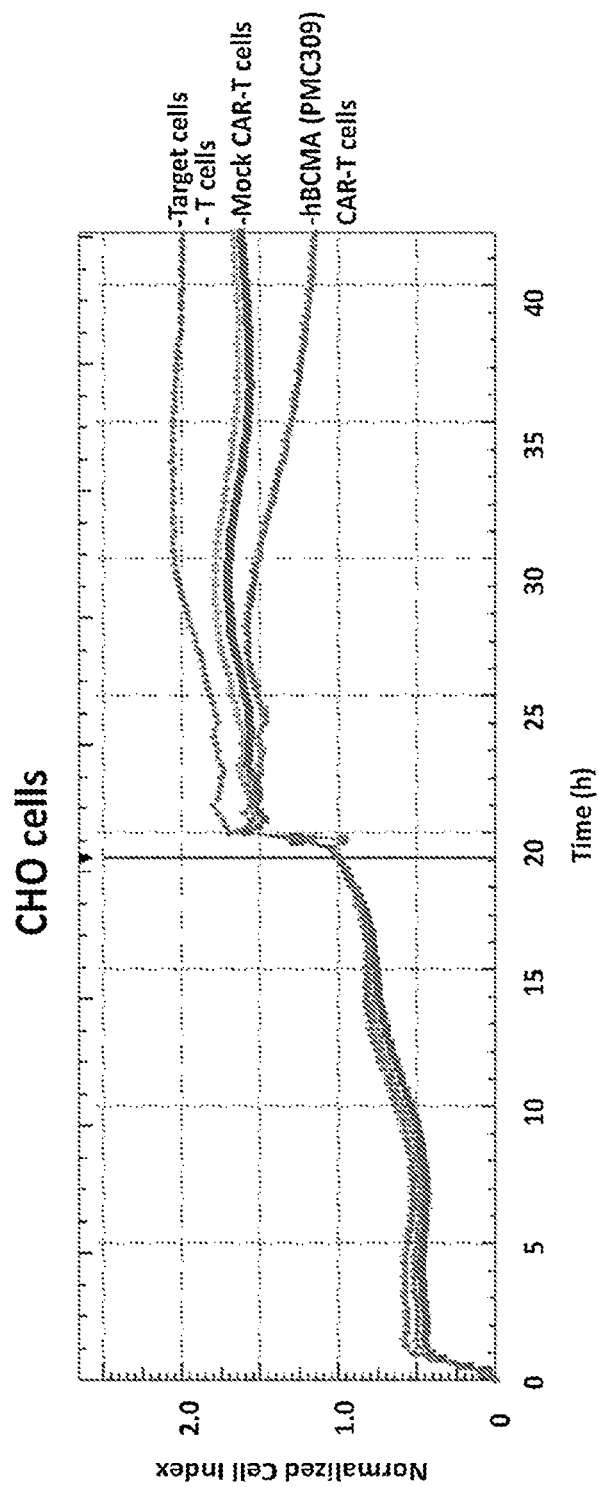

The lentivirus was prepared using 293 S cells as described in [6]. We transduced T cells with Humanized BCMA-CAR lentivirus, CAR-T cells were expanded and expressed BCMA scFv, which was detected with BCMA recombinant protein (as described [6]). Then, we incubated humanized BCMA-CAR-T cells with target CHO-BCMA target cells and also with CHO (BCMA-negative) control cells. Humanized BCMA-CAR-T cells specifically killed CHO-BCMA cells (FIG. 4A) but not CHO cells (FIG. 4B). This demonstrate high specificity of humanized BCMA-CAR-T cells to targeting BCMA antigen and killing BCMA-positive cells.

Figure 5:
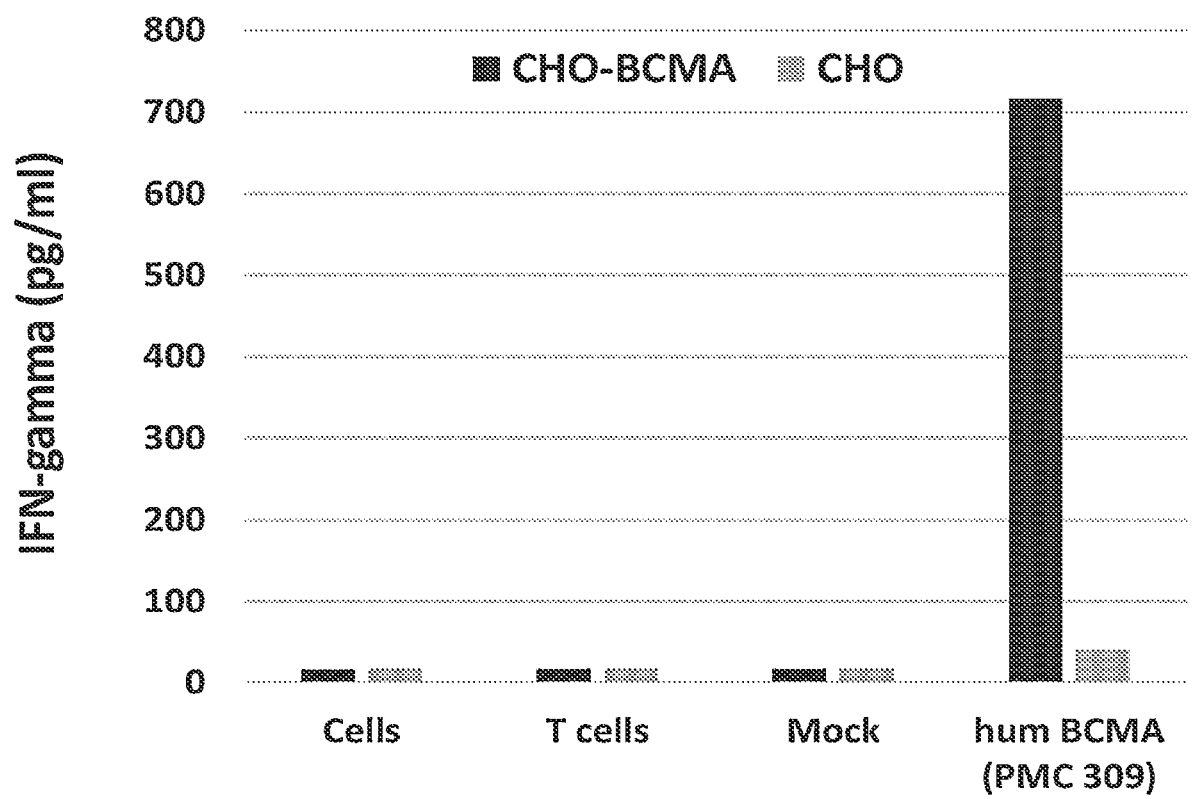
FIG. 5. Humanized BCMA-CAR-T cells secreted high level of IFN-gamma with CHO-BCMA-positive cells. p<0.05, IFN-gamma in CHO-BCMA cells versus T and Mock CAR-T cells.

Example 12. Humanized CAR-T Cells Secrete IFN-gamma against Target CHO-BCMA Cells Significantly We collected supernatant after co-incubation of humanized BCMA-CAR-T cells and target CHO-BCMA cells and performed IFN-gamma assay. BCMA-CAR-T cells secreted high level of IFN-gamma with CHO-BCMA cells (FIG. 5). Low secretion of IFN-gamma was observed with control CHO cells (FIG. 5). This confirms the specificity of humanized BCMA-CAR-T cells. Humanized BCMA CAR-T cells also secreted higher levels of IFN-gamma against RPMI8226 cells compared with BCMA-negative K562 cells (datanot shown).

Example 13. Humanized BCMA-41BB-CD3 CAR-T cells (PMC750) Expressed High Percent of CAR-Positive Cells, Killed BCMA-Positive Target Cells and Secreted High Level of IFN-gamma.

Figure 6A:
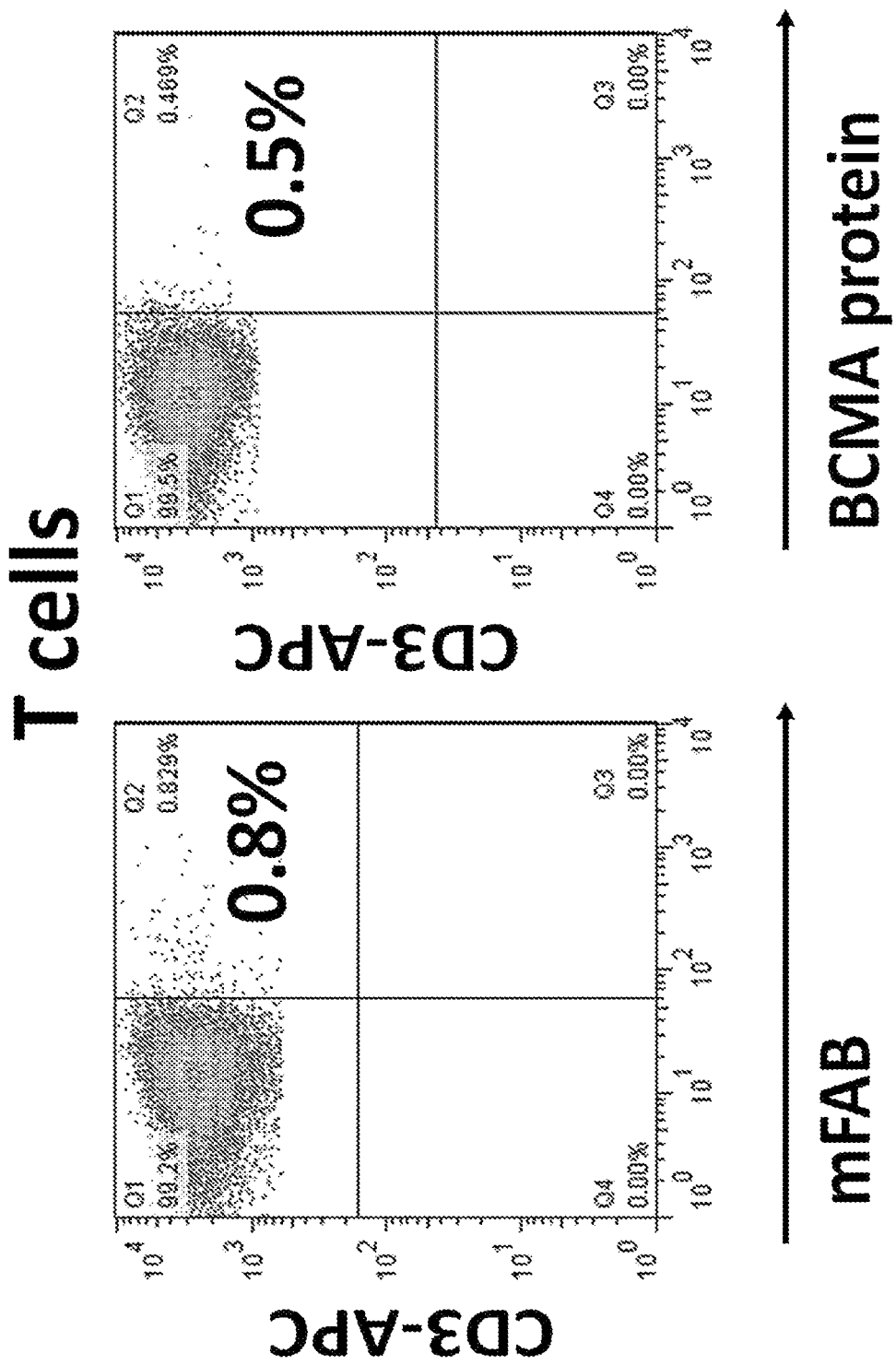
FIGS. 6A and 6B. FACS with anti-mouse F(ab)'$_2$ (mFAB) (FIG. 6A) and fluorescently labelled BCMA protein (FIG. 6B) on hBCMA-CAR-T cells (PMC750) showed high percent of CAR-positive cells during 9 days of expansion.
Figure 6B:
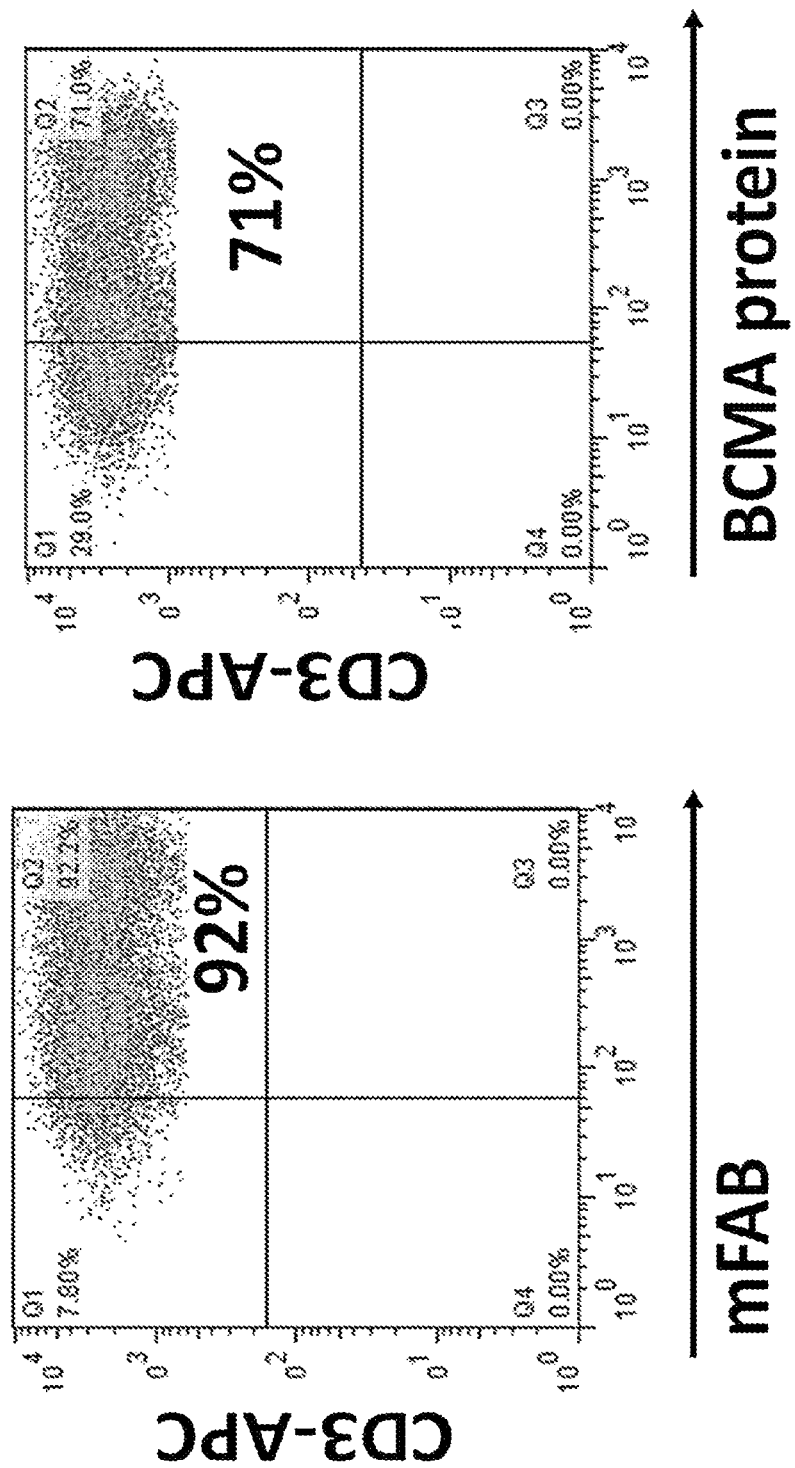

We re-cloned humanized BCMA with 41BB co-stimulatory domain and MNDU3 promoter to have higher persistency of CAR-T cells. after transduction, CAR-T cells had high percent of BCMA ScFv-positive cells (FIGS. 6A-6B). We detected >70% CAR-positive cells at day 9 after expansion that was detected with both anti-mouse F(ab)$_2$ and recombinant fluorescently labelled BCMA protein (FIGS. 6A-6B).

Figure 7A:
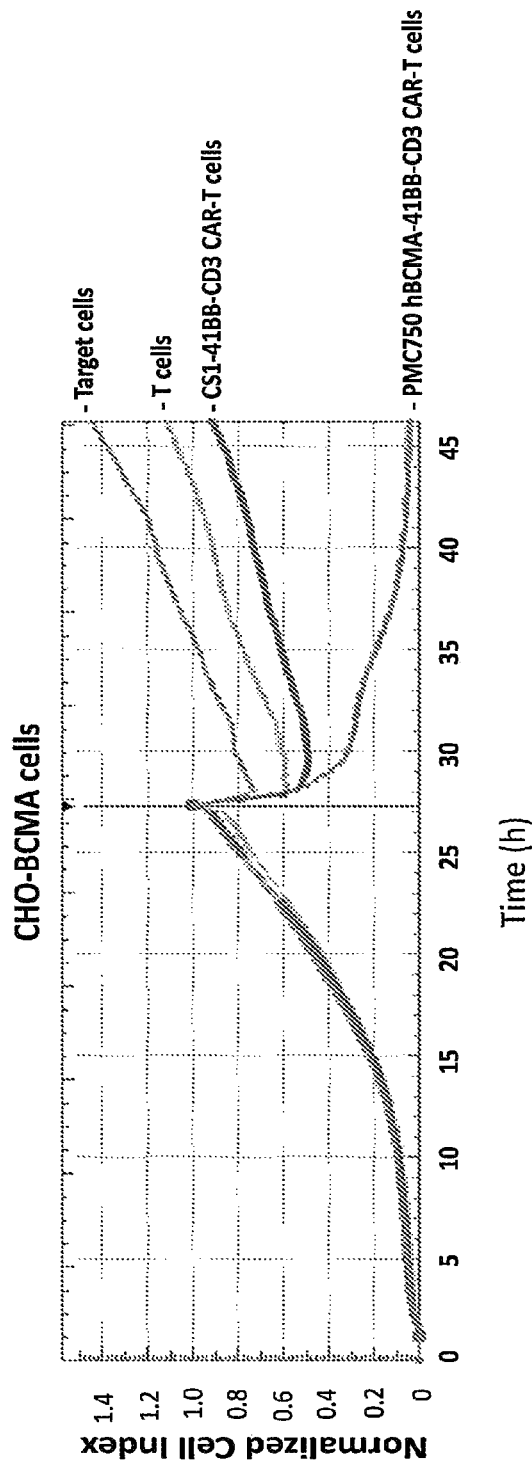
FIGS. 7A and 7B. RTCA (real-time cytotoxicity assay) demonstrate effective and specific killing of CHO-BCMA cells (7A), but not CHO-BCMA (7B) by PMC750 CAR-T cells.
Figure 7B:
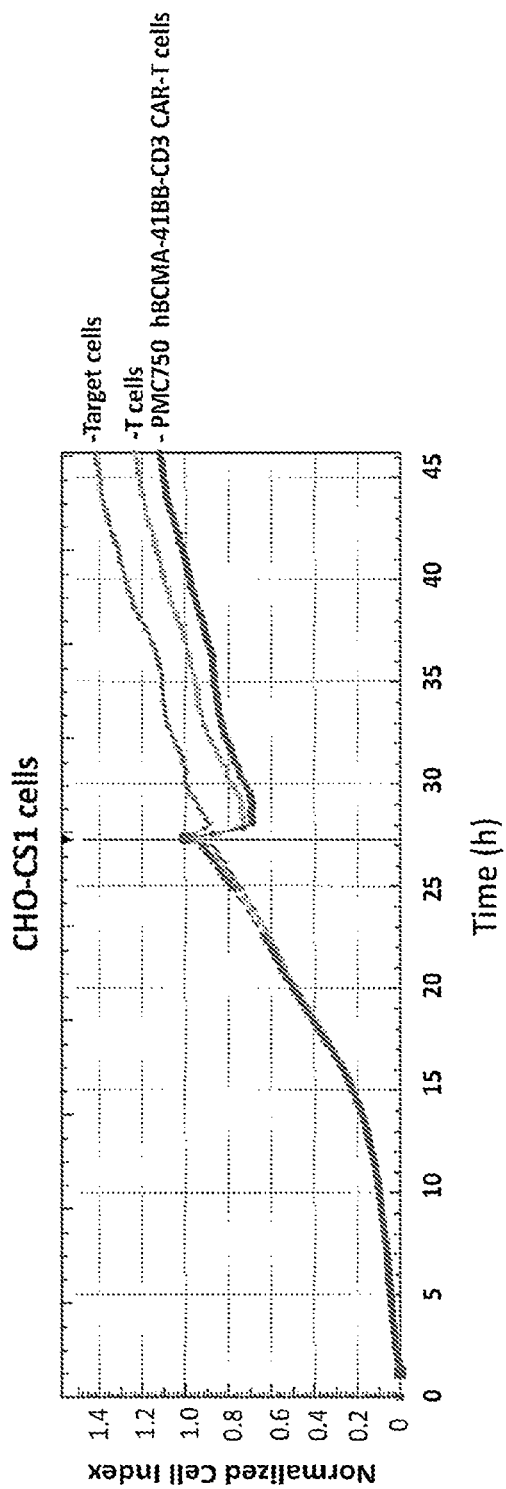

We performed cytotoxicity assay using PMC750 h BCMA-CAR-T cells as effector cells and CHO-BCMA cells as target cells. hBCMA-41BB-CD3 CAR-T cells effectively killed CHO-BCMA cells (FIG. 7A) and did not kill control BCMA-negative CHO-CS1 cells, while CS1-CAR-T cells killed (FIG. 7B).

Figure 8:
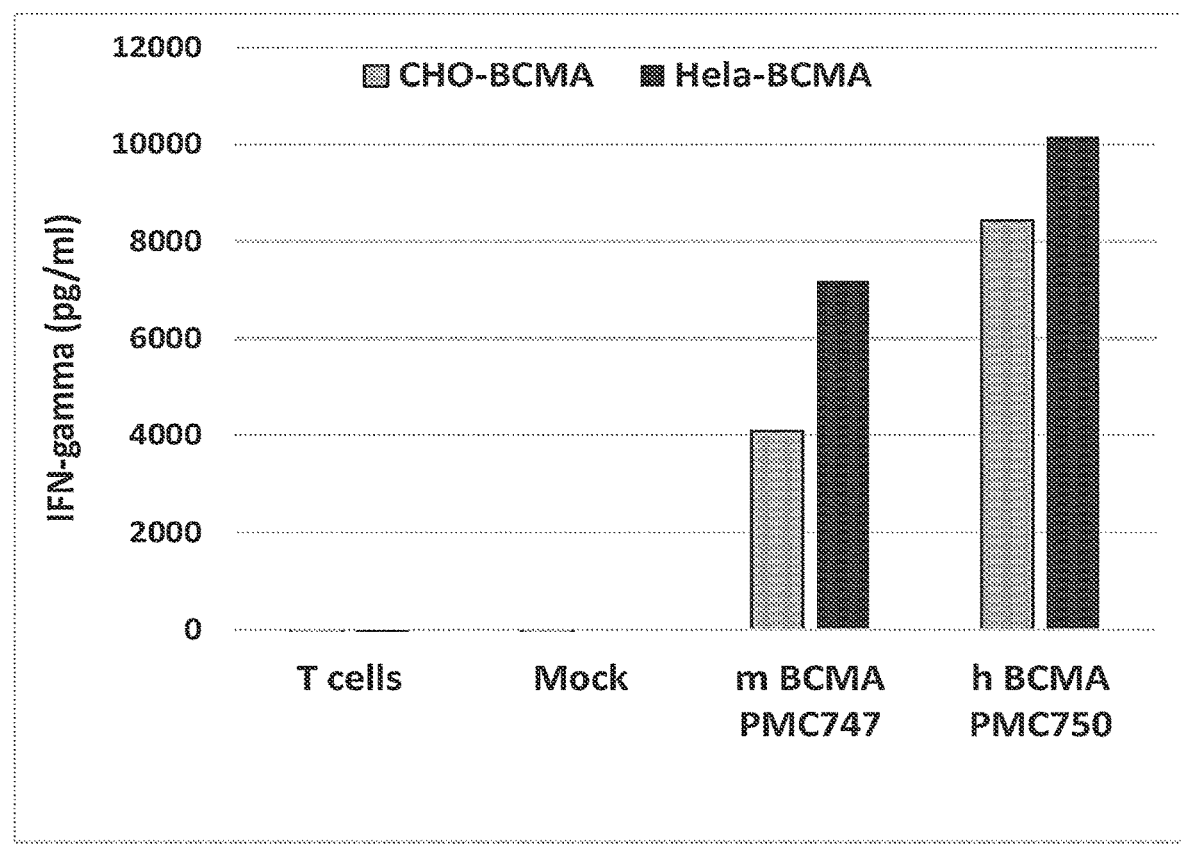
FIG. 8. IFN-gamma secretion by humanized BCMA PMC750 and mouse BCMA CAR-T cells in CHO-BCMA and Hela-BCMA cells.

We detected high level of IFN-gamma secreted by PMC750 hBCMA-CAR-T cells against CHO and Hela-BCMA-positive cells, which were higher than IFN-gamma level secreted by mouse BCMA-CAR-T cells (FIG. 8).

Figure 9A:
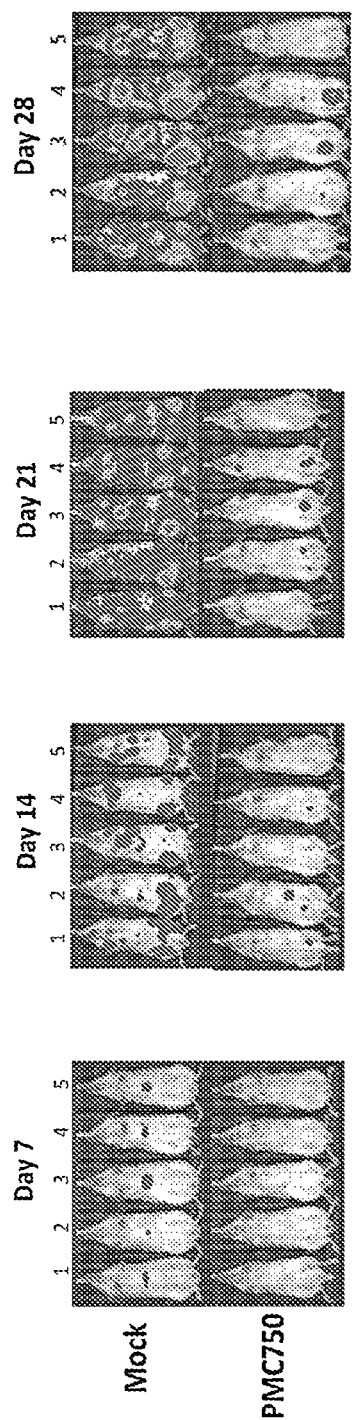
FIGS. 9A-9B. Humanized BCMA-CAR-T cells significantly decreased RPMI8226 xenograft tumor growth. *p<0.001, BCMA-CAR-T cells (PMC750) vs Mock (PBS-control).
Figure 9B:
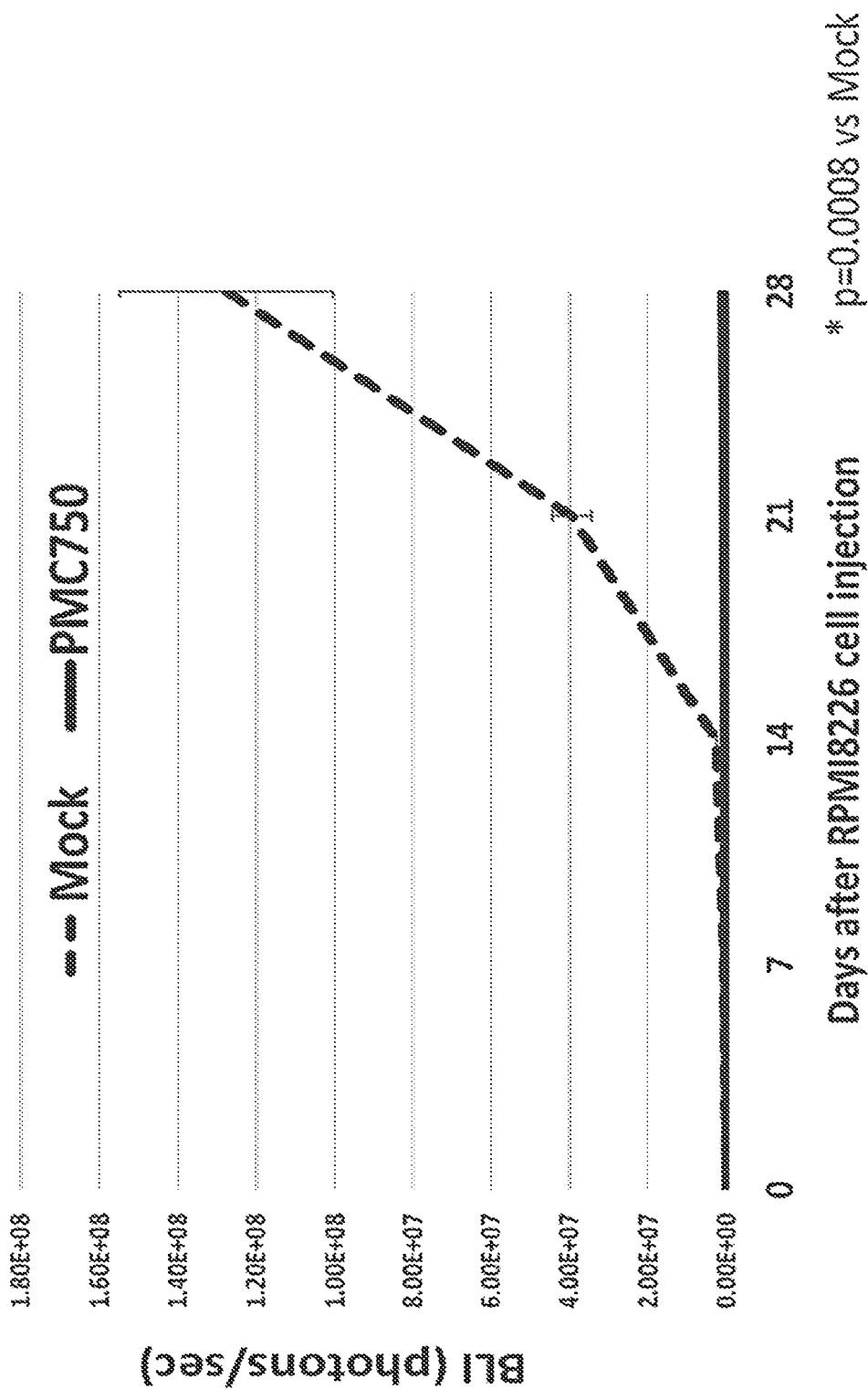

Example 14. Humanized BCMA-CAR-T Cells Significantly Decreased RPMI8226 Xenograft Tumor Growth in Mouse Model In Vivo Multiple myeloma RPMI8226-luciferase positive cells were injected intravenously into NSG mice (2×10$^6$ cells/mice), and then next day humanized BCMA-CAR-T cells (PMC750) were injected by i.v. (1×10$^7$ CAR-T cells/mice). The imaging with luciferin was performed to detect tumor growth (FIG. 9A). Humanized BCMA-CAR-T cells significantly decreased RPMI8226 tumor growth in mice, p<0.001 (FIG. 9B). No behavior or visual changes were observed during the study.

REFERENCES

[1] M. V. Maus, A. R. Haas, G. L. Beatty, S. M. Albelda, B. L. Levine, X. Liu, Y. Zhao, M. Kalos, and C. H. June, T cells expressing chimeric antigen receptors can cause anaphylaxis in humans. Cancer Immunol Res 1 (2013) 26-31.
[2] M. V. Maus, S. A. Grupp, D. L. Porter, and C. H. June, Antibody-modified T cells: CARs take the front seat for hematologic malignancies. Blood 123 (2014) 2625-35.
[3] V. Golubovskaya, and L. Wu, Different Subsets of T Cells, Memory, Effector Functions, and CAR-T Immunotherapy. Cancers (Basel) 8 (2016).
[4] S. A. Ali, V. Shi, I. Maric, M. Wang, D. F. Stroncek, J. J. Rose, J. N. Brudno, M. Stetler—Stevenson, S. A. Feldman, B. G. Hansen, V. S. Fellowes, F. T. Hakim, R. E. Gress, and J. N. Kochenderfer, T cells expressing an anti-B-cell maturation antigen chimeric antigen receptor cause remissions of multiple myeloma. Blood 128 (2016) 1688-700.
[5]Y. T. Tai, and K. C. Anderson, Targeting B—cell maturation antigen in multiple myeloma. Immunotherapy (2015).
[6] R. Berahovich, H. Zhou, S. Xu, Y. Wei, J. Guan, J. Guan, H. Harto, S. Fu, K. Yang, S. Zhu, L. Li, L. Wu, and V. Golubovskaya, CAR-T Cells Based on Novel BCMA Monoclonal Antibody Block Multiple Myeloma Cell Growth. Cancers (Basel) 10 (2018).

What is claimed is:

1. An anti-human BCMA antibody or an antigen-binding fragment thereof comprising a VH having the amino acid of SEQ ID NO: 4, and a VL having the amino acid of SEQ ID NO: 5.

2. A humanized anti-human BCMA single-chain variable fragment (scFv) comprising a VH having the amino acid of SEQ ID NO: 4, and a VL having the amino acid of SEQ ID NO: 5.

3. The scFv of claim 2, further comprising a linker in between the VH and the VL.

4. The scFv of claim 2, which has the amino acid sequence of SEQ ID NO: 3.

5. A chimeric antigen receptor (CAR) fusion protein comprising from N-terminus to C-terminus:

(i) the scFv of claim 3,
(ii) a transmembrane domain,
(iii) at least one co-stimulatory domains, and
(iv) an activating domain.

6. The CAR according to claim 5, wherein the co-stimulatory domain is CD28 or 4-1BB.

7. The CAR according to claim 5, wherein the activating domain is CD3 zeta.

8. The CAR of claim 5, which has the amino acid sequence of SEQ ID NO: 16.

9. The CAR of claim 5, which has the amino acid sequence of SEQ ID NO: 17.

10. A nucleic acid encoding the CAR of claim 5.

11. T cells or natural killer cells modified to express the CAR of claim 5.

* * * * *

SEQUENCE LISTING

```
<160> NUMBER OF SEQ ID NOS: 17

<210> SEQ ID NO 1
<211> LENGTH: 184
<212> TYPE: PRT
<213> ORGANISM: Homo sapiens

<400> SEQUENCE: 1

Met Leu Gln Met Ala Gly Gln Cys Ser Gln Asn Glu Tyr Phe Asp Ser
1               5                   10                  15

Leu Leu His Ala Cys Ile Pro Cys Gln Leu Arg Cys Ser Ser Asn Thr
            20                  25                  30

Pro Pro Leu Thr Cys Gln Arg Tyr Cys Asn Ala Ser Val Thr Asn Ser
        35                  40                  45

Val Lys Gly Thr Asn Ala Ile Leu Trp Thr Cys Leu Gly Leu Ser Leu
    50                  55                  60

Ile Ile Ser Leu Ala Val Phe Val Leu Met Phe Leu Leu Arg Lys Ile
65                  70                  75                  80

Asn Ser Glu Pro Leu Lys Asp Glu Phe Lys Asn Thr Gly Ser Gly Leu
                85                  90                  95

Leu Gly Met Ala Asn Ile Asp Leu Glu Lys Ser Arg Thr Gly Asp Glu
            100                 105                 110

Ile Ile Leu Pro Arg Gly Leu Glu Tyr Thr Val Glu Glu Cys Thr Cys
        115                 120                 125

Glu Asp Cys Ile Lys Ser Lys Pro Lys Val Asp Ser Asp His Cys Phe
    130                 135                 140

Pro Leu Pro Ala Met Glu Glu Gly Ala Thr Ile Leu Val Thr Thr Lys
145                 150                 155                 160

Thr Asn Asp Tyr Cys Lys Ser Leu Pro Ala Ala Leu Ser Ala Thr Glu
                165                 170                 175
```

Ile Glu Lys Ser Ile Ser Ala Arg
            180

<210> SEQ ID NO 2
<211> LENGTH: 720
<212> TYPE: DNA
<213> ORGANISM: Homo sapiens

<400> SEQUENCE: 2

```
caggtgcagc tggtgcagag cggcgcggaa gtgaaaaaac cgggcagcag cgtgaaagtg    60
agctgcaaag cgagcggcta cctttacc agctatgtga tgcattgggt gcgccaggcg   120
ccgggccagg gcctggaatg gatgggctat attattccgt ataacgatgc gaccaaatat   180
aacgaaaaat ttaaaggccg cgtgaccatt accgcggata aaagcaccag caccgcgtat   240
atggaactga gcagcctgcg cagcgaagat accgcggtgt attattgcgc gcgctataac   300
tatgatggct attttgatgt gtggggccag ggcaccctgg tgaccgtgag cagcggcggc   360
ggcggcagcg gcggcggcgg cagcggcggc ggcggcagcg atgtggtgat gacccagagc   420
ccggcgtttc tgagcgtgac cccgggcgaa aaagtgacca ttacctgccg cgcgagccag   480
agcattagcg attatctgca ttggtatcag cagaaaccgg atcaggcgcc gaaactgctg   540
attaaatatg cgagccagag cattagcggc gtgccgagcc gctttagcgg cagcggcagc   600
ggcaccgatt ttacctttac cattagcagc ctggaagcgg aagatgcggc gacctattat   660
tgccagaacg ccatagcttt ccgccgacc tttggcggcg gcaccaaagt ggaaattaaa   720
```

<210> SEQ ID NO 3
<211> LENGTH: 240
<212> TYPE: PRT
<213> ORGANISM: Homo sapiens

<400> SEQUENCE: 3

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Thr Ser Tyr
            20                  25                  30

Val Met His Trp Val Arg Gln Ala Pro Gly Gln Gly Leu Glu Trp Met
        35                  40                  45

Gly Tyr Ile Ile Pro Tyr Asn Asp Ala Thr Lys Tyr Asn Glu Lys Phe
    50                  55                  60

Lys Gly Arg Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
            85                  90                  95

Ala Arg Tyr Asn Tyr Asp Gly Tyr Phe Asp Val Trp Gly Gln Gly Thr
        100                 105                 110

Leu Val Thr Val Ser Ser Gly Gly Gly Gly Ser Gly Gly Gly Gly Ser
    115                 120                 125

Gly Gly Gly Gly Ser Asp Val Val Met Thr Gln Ser Pro Ala Phe Leu
130                 135                 140

Ser Val Thr Pro Gly Glu Lys Val Thr Ile Thr Cys Arg Ala Ser Gln
145                 150                 155                 160

Ser Ile Ser Asp Tyr Leu His Trp Tyr Gln Gln Lys Pro Asp Gln Ala
            165                 170                 175

Pro Lys Leu Leu Ile Lys Tyr Ala Ser Gln Ser Ile Ser Gly Val Pro
        180                 185                 190

```
Ser Arg Phe Ser Gly Ser Gly Ser Gly Thr Asp Phe Thr Phe Thr Ile
        195                 200                 205
Ser Ser Leu Glu Ala Glu Asp Ala Ala Thr Tyr Tyr Cys Gln Asn Gly
210                 215                 220
His Ser Phe Pro Pro Thr Phe Gly Gly Gly Thr Lys Val Glu Ile Lys
225                 230                 235                 240

<210> SEQ ID NO 4
<211> LENGTH: 118
<212> TYPE: PRT
<213> ORGANISM: Homo sapiens

<400> SEQUENCE: 4

Gln Val Gln Leu Val Gln Ser Gly Ala Glu Val Lys Lys Pro Gly Ser
1               5                   10                  15
Ser Val Lys Val Ser Cys Lys Ala Ser Gly Tyr Thr Phe Thr Ser Tyr
                20                  25                  30
Val Met His Trp Val Arg Gln Ala Pro Gly Gln Gly Leu Glu Trp Met
            35                  40                  45
Gly Tyr Ile Ile Pro Tyr Asn Asp Ala Thr Lys Tyr Asn Glu Lys Phe
        50                  55                  60
Lys Gly Arg Val Thr Ile Thr Ala Asp Lys Ser Thr Ser Thr Ala Tyr
65                  70                  75                  80
Met Glu Leu Ser Ser Leu Arg Ser Glu Asp Thr Ala Val Tyr Tyr Cys
                85                  90                  95
Ala Arg Tyr Asn Tyr Asp Gly Tyr Phe Asp Val Trp Gly Gln Gly Thr
            100                 105                 110
Leu Val Thr Val Ser Ser
        115

<210> SEQ ID NO 5
<211> LENGTH: 107
<212> TYPE: PRT
<213> ORGANISM: Homo sapiens

<400> SEQUENCE: 5

Asp Val Val Met Thr Gln Ser Pro Ala Phe Leu Ser Val Thr Pro Gly
1               5                   10                  15
Glu Lys Val Thr Ile Thr Cys Arg Ala Ser Gln Ser Ile Ser Asp Tyr
                20                  25                  30
Leu His Trp Tyr Gln Gln Lys Pro Asp Gln Ala Pro Lys Leu Leu Ile
            35                  40                  45
Lys Tyr Ala Ser Gln Ser Ile Ser Gly Val Pro Ser Arg Phe Ser Gly
        50                  55                  60
Ser Gly Ser Gly Thr Asp Phe Thr Phe Thr Ile Ser Ser Leu Glu Ala
65                  70                  75                  80
Glu Asp Ala Ala Thr Tyr Tyr Cys Gln Asn Gly His Ser Phe Pro Pro
                85                  90                  95
Thr Phe Gly Gly Gly Thr Lys Val Glu Ile Lys
            100                 105

<210> SEQ ID NO 6
<211> LENGTH: 15
<212> TYPE: PRT
<213> ORGANISM: Artificial Sequence
<220> FEATURE:
<223> OTHER INFORMATION: Synthetic

<400> SEQUENCE: 6
```

```
Gly Gly Gly Gly Ser Gly Gly Gly Ser Gly Gly Gly Ser
1               5                   10                  15
```

<210> SEQ ID NO 7
<211> LENGTH: 63
<212> TYPE: DNA
<213> ORGANISM: Homo sapiens

<400> SEQUENCE: 7

```
atggccttac cagtgaccgc cttgctcctg ccgctggcct tgctgctcca cgccgccagg    60
ccg                                                                 63
```

<210> SEQ ID NO 8
<211> LENGTH: 21
<212> TYPE: PRT
<213> ORGANISM: Homo sapiens

<400> SEQUENCE: 8

```
Met Ala Leu Pro Val Thr Ala Leu Leu Leu Pro Leu Ala Leu Leu Leu
1               5                   10                  15

His Ala Ala Arg Pro
            20
```

<210> SEQ ID NO 9
<211> LENGTH: 141
<212> TYPE: DNA
<213> ORGANISM: Homo sapiens

<400> SEQUENCE: 9

```
aagcccacca cgacgccagc gccgcgacca ccaacaccgg cgcccaccat cgcgtcgcag    60
cccctgtccc tgcgcccaga ggcgagccgg ccagcggcgg ggggcgcagt gcacacgagg   120
gggctggact cgccagtga t                                              141
```

<210> SEQ ID NO 10
<211> LENGTH: 47
<212> TYPE: PRT
<213> ORGANISM: Homo sapiens

<400> SEQUENCE: 10

```
Lys Pro Thr Thr Thr Pro Ala Pro Arg Pro Pro Thr Pro Ala Pro Thr
1               5                   10                  15

Ile Ala Ser Gln Pro Leu Ser Leu Arg Pro Glu Ala Ser Arg Pro Ala
            20                  25                  30

Ala Gly Gly Ala Val His Thr Arg Gly Leu Asp Phe Ala Ser Asp
        35                  40                  45
```

<210> SEQ ID NO 11
<211> LENGTH: 204
<212> TYPE: DNA
<213> ORGANISM: Homo sapiens

<400> SEQUENCE: 11

```
ttttgggtgc tggtggtggt tggtggagtc ctggcttgct atagcttgct agtaacagtg    60
gcctttatta ttttctgggt gaggagtaag aggagcaggc tcctgcacag tgactacatg   120
aacatgactc cccgccgccc cgggcccacc cgcaagcatt accagcccta tgccccacca   180
cgcgacttcg cagcctatcg ctcc                                          204
```

<210> SEQ ID NO 12

<211> LENGTH: 68
<212> TYPE: PRT
<213> ORGANISM: Homo sapiens

<400> SEQUENCE: 12

```
Phe Trp Val Leu Val Val Gly Gly Val Leu Ala Cys Tyr Ser Leu
1               5                   10                  15

Leu Val Thr Val Ala Phe Ile Ile Phe Trp Val Arg Ser Lys Arg Ser
            20                  25                  30

Arg Leu Leu His Ser Asp Tyr Met Asn Met Thr Pro Arg Arg Pro Gly
        35                  40                  45

Pro Thr Arg Lys His Tyr Gln Pro Tyr Ala Pro Arg Asp Phe Ala
    50                  55                  60

Ala Tyr Arg Ser
65
```

<210> SEQ ID NO 13
<211> LENGTH: 345
<212> TYPE: DNA
<213> ORGANISM: Homo sapiens

<400> SEQUENCE: 13

```
agagtgaagt tcagcaggag cgcagacgcc cccgcgtacc agcagggcca gaaccagctc      60
tataacgagc tcaatctagg acgaagagag gagtacgatg ttttggacaa gagacgtggc     120
cgggaccctg agatgggggg aaagccgcag agaaggaaga accctcagga aggcctgtac     180
aatgaactgc agaaagataa gatggcggag gcctacagtg agattgggat gaaaggcgag     240
cgccggaggg gcaaggggca cgatggcctt taccagggtc tcagtacagc caccaaggac     300
acctacgacg cccttcacat gcaggccctg ccccctcgct aatag                    345
```

<210> SEQ ID NO 14
<211> LENGTH: 113
<212> TYPE: PRT
<213> ORGANISM: Homo sapiens

<400> SEQUENCE: 14

```
Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
                100                 105                 110

Arg
```

<210> SEQ ID NO 15
<211> LENGTH: 1488
<212> TYPE: DNA
<213> ORGANISM: Homo sapiens

<400> SEQUENCE: 15

```
atggccttac cagtgaccgc cttgctcctg ccgctggcct tgctgctcca cgccgccagg    60
ccggctagcc aggtgcagct ggtgcagagc ggcgcggaag tgaaaaaacc gggcagcagc   120
gtgaaagtga gctgcaaagc gagcggctat acctttacca gctatgtgat gcattgggtg   180
cgccaggcgc cgggccaggg cctggaatgg atgggctata ttattccgta taacgatgcg   240
accaaatata cgaaaaatt taaaggccgc gtgaccatta ccgcggataa aagcaccagc   300
accgcgtata tggaactgag cagcctgcgc agcgaagata ccgcggtgta ttattgcgcg   360
cgctataact atgatggcta ttttgatgtg tggggccagg gcaccctggt gaccgtgagc   420
agcggcggcg gcggcagcgg cggcggcggc agcggcggcg gcggcagcga tgtggtgatg   480
acccagagcc cggcgtttct gagcgtgacc ccgggcgaaa aagtgaccat acctgccgc    540
gcgagccaga gcattagcga ttatctgcat tggtatcagc agaaaccgga tcaggcgccg   600
aaactgctga ttaaatatgc gagccagagc attagcggcg tgccgagccg ctttagcggc   660
agcggcagcg gcaccgattt tacctttacc attagcagcc tggaagcgga agatgcggcg   720
acctattatt gccagaacgg ccatagcttt cgccgaccct ttggcggcgg caccaaagtg   780
gaaattaaac tcgagaagcc caccacgacg ccagcgccgc gaccaccaac accggcgccc   840
accatcgcgt cgcagcccct gtccctgcgc ccagaggcga gcggccagc ggcgggggc    900
gcagtgcaca cgagggggct ggacttcgcc agtgataagc ccttttgggt gctggtggtg   960
gttggtggag tcctggcttg ctatagcttg ctagtaacag tggcctttat tattttctgg  1020
gtgaggagta agaggagcag gctcctgcac agtgactaca tgaacatgac cccccgccgc  1080
cccgggccca cccgcaagca ttaccagccc tatgccccac cacgcgactt cgcagcctat  1140
cgctccagag tgaagttcag caggagcgca gacgcccccg cgtaccagca gggccagaac  1200
cagctctata acgagctcaa tctaggacga agagaggagt acgatgttt ggacaagaga   1260
cgtggccggg accctgagat ggggggaaag ccgcagagaa ggaagaaccc tcaggaaggc  1320
ctgtacaatg aactgcagaa agataagatg gcggaggcct acagtgagat tgggatgaaa  1380
ggcgagcgcc ggagggggcaa ggggcacgat ggcctttacc agggtctcag tacagccacc  1440
aaggacacct acgacgccct tcacatgcag gccctgcccc ctcgctaa                1488
```

<210> SEQ ID NO 16
<211> LENGTH: 495
<212> TYPE: PRT
<213> ORGANISM: Homo sapiens

<400> SEQUENCE: 16

```
Met Ala Leu Pro Val Thr Ala Leu Leu Leu Pro Leu Ala Leu Leu Leu
1               5                   10                  15

His Ala Ala Arg Pro Ala Ser Gln Val Gln Leu Val Gln Ser Gly Ala
                20                  25                  30

Glu Val Lys Lys Pro Gly Ser Ser Val Lys Val Ser Cys Lys Ala Ser
            35                  40                  45

Gly Tyr Thr Phe Thr Ser Tyr Val Met His Trp Val Arg Gln Ala Pro
        50                  55                  60

Gly Gln Gly Leu Glu Trp Met Gly Tyr Ile Ile Pro Tyr Asn Asp Ala
65                  70                  75                  80

Thr Lys Tyr Asn Glu Lys Phe Lys Gly Arg Val Thr Ile Thr Ala Asp
                85                  90                  95

Lys Ser Thr Ser Thr Ala Tyr Met Glu Leu Ser Ser Leu Arg Ser Glu
            100                 105                 110
```

```
Asp Thr Ala Val Tyr Tyr Cys Ala Arg Tyr Asn Tyr Asp Gly Tyr Phe
            115                 120                 125

Asp Val Trp Gly Gln Gly Thr Leu Val Thr Val Ser Ser Gly Gly Gly
        130                 135                 140

Gly Ser Gly Gly Gly Gly Ser Gly Gly Gly Gly Ser Asp Val Val Met
145                 150                 155                 160

Thr Gln Ser Pro Ala Phe Leu Ser Val Thr Pro Gly Glu Lys Val Thr
                165                 170                 175

Ile Thr Cys Arg Ala Ser Gln Ser Ile Ser Asp Tyr Leu His Trp Tyr
            180                 185                 190

Gln Gln Lys Pro Asp Gln Ala Pro Lys Leu Leu Ile Lys Tyr Ala Ser
        195                 200                 205

Gln Ser Ile Ser Gly Val Pro Ser Arg Phe Ser Gly Ser Gly Ser Gly
210                 215                 220

Thr Asp Phe Thr Phe Thr Ile Ser Ser Leu Glu Ala Glu Asp Ala Ala
225                 230                 235                 240

Thr Tyr Tyr Cys Gln Asn Gly His Ser Phe Pro Thr Phe Gly Gly Gly
                245                 250                 255

Gly Thr Lys Val Glu Ile Lys Leu Glu Lys Pro Thr Thr Thr Pro Ala
            260                 265                 270

Pro Arg Pro Pro Thr Pro Ala Pro Thr Ile Ala Ser Gln Pro Leu Ser
        275                 280                 285

Leu Arg Pro Glu Ala Ser Arg Pro Ala Ala Gly Gly Ala Val His Thr
    290                 295                 300

Arg Gly Leu Asp Phe Ala Ser Asp Lys Pro Phe Trp Val Leu Val Val
305                 310                 315                 320

Val Gly Gly Val Leu Ala Cys Tyr Ser Leu Leu Val Thr Val Ala Phe
                325                 330                 335

Ile Ile Phe Trp Val Arg Ser Lys Arg Ser Arg Leu Leu His Ser Asp
            340                 345                 350

Tyr Met Asn Met Thr Pro Arg Arg Pro Gly Pro Thr Arg Lys His Tyr
        355                 360                 365

Gln Pro Tyr Ala Pro Pro Arg Asp Phe Ala Ala Tyr Arg Ser Arg Val
    370                 375                 380

Lys Phe Ser Arg Ser Ala Asp Ala Pro Ala Tyr Gln Gln Gly Gln Asn
385                 390                 395                 400

Gln Leu Tyr Asn Glu Leu Asn Leu Gly Arg Arg Glu Glu Tyr Asp Val
                405                 410                 415

Leu Asp Lys Arg Arg Gly Arg Asp Pro Glu Met Gly Gly Lys Pro Gln
            420                 425                 430

Arg Arg Lys Asn Pro Gln Glu Gly Leu Tyr Asn Glu Leu Gln Lys Asp
        435                 440                 445

Lys Met Ala Glu Ala Tyr Ser Glu Ile Gly Met Lys Gly Glu Arg Arg
    450                 455                 460

Arg Gly Lys Gly His Asp Gly Leu Tyr Gln Gly Leu Ser Thr Ala Thr
465                 470                 475                 480

Lys Asp Thr Tyr Asp Ala Leu His Met Gln Ala Leu Pro Pro Arg
                485                 490                 495

<210> SEQ ID NO 17
<211> LENGTH: 496
<212> TYPE: PRT
<213> ORGANISM: Homo sapiens
```

<400> SEQUENCE: 17

Met Ala Leu Pro Val Thr Ala Leu Leu Leu Pro Leu Ala Leu Leu Leu
1               5                   10                  15

His Ala Ala Arg Pro Ala Ser Gln Val Gln Leu Val Gln Ser Gly Ala
            20                  25                  30

Glu Val Lys Lys Pro Gly Ser Ser Val Lys Val Ser Cys Lys Ala Ser
        35                  40                  45

Gly Tyr Thr Phe Thr Ser Tyr Val Met His Trp Val Arg Gln Ala Pro
50                  55                  60

Gly Gln Gly Leu Glu Trp Met Gly Tyr Ile Ile Pro Tyr Asn Asp Ala
65                  70                  75                  80

Thr Lys Tyr Asn Glu Lys Phe Lys Gly Arg Val Thr Ile Thr Ala Asp
                85                  90                  95

Lys Ser Thr Ser Thr Ala Tyr Met Glu Leu Ser Ser Leu Arg Ser Glu
            100                 105                 110

Asp Thr Ala Val Tyr Tyr Cys Ala Arg Tyr Asn Tyr Asp Gly Tyr Phe
        115                 120                 125

Asp Val Trp Gly Gln Gly Thr Leu Val Thr Val Ser Ser Gly Gly Gly
130                 135                 140

Gly Ser Gly Gly Gly Gly Ser Gly Gly Gly Gly Ser Asp Val Val Met
145                 150                 155                 160

Thr Gln Ser Pro Ala Phe Leu Ser Val Thr Pro Gly Glu Lys Val Thr
                165                 170                 175

Ile Thr Cys Arg Ala Ser Gln Ser Ile Ser Asp Tyr Leu His Trp Tyr
            180                 185                 190

Gln Gln Lys Pro Asp Gln Ala Pro Lys Leu Leu Ile Lys Tyr Ala Ser
        195                 200                 205

Gln Ser Ile Ser Gly Val Pro Ser Arg Phe Ser Gly Ser Gly Ser Gly
210                 215                 220

Thr Asp Phe Thr Phe Thr Ile Ser Ser Leu Glu Ala Glu Asp Ala Ala
225                 230                 235                 240

Thr Tyr Tyr Cys Gln Asn Gly His Ser Phe Pro Pro Thr Phe Gly Gly
                245                 250                 255

Gly Thr Lys Val Glu Ile Lys Leu Glu Lys Pro Thr Thr Thr Pro Ala
            260                 265                 270

Pro Arg Pro Pro Thr Pro Ala Pro Thr Ile Ala Ser Gln Pro Leu Ser
        275                 280                 285

Leu Arg Pro Glu Ala Ser Arg Pro Ala Ala Gly Gly Ala Val His Thr
290                 295                 300

Arg Gly Leu Asp Phe Ala Ser Asp Lys Pro Phe Trp Val Leu Val Val
305                 310                 315                 320

Val Gly Gly Val Leu Ala Cys Tyr Ser Leu Leu Val Thr Val Ala Phe
                325                 330                 335

Ile Ile Phe Trp Val Lys Arg Gly Arg Lys Lys Leu Leu Tyr Ile Phe
            340                 345                 350

Lys Gln Pro Phe Met Arg Pro Val Gln Thr Thr Gln Glu Glu Asp Gly
        355                 360                 365

Cys Ser Cys Arg Phe Pro Glu Glu Glu Glu Gly Gly Cys Glu Leu Arg
370                 375                 380

Val Lys Phe Ser Arg Ser Ala Asp Ala Pro Ala Tyr Gln Gln Gly Gln
385                 390                 395                 400

Asn Gln Leu Tyr Asn Glu Leu Asn Leu Gly Arg Arg Glu Glu Tyr Asp
                405                 410                 415

```
Val Leu Asp Lys Arg Arg Gly Arg Asp Pro Glu Met Gly Gly Lys Pro
            420                 425                 430

Gln Arg Arg Lys Asn Pro Gln Glu Gly Leu Tyr Asn Glu Leu Gln Lys
            435                 440                 445

Asp Lys Met Ala Glu Ala Tyr Ser Glu Ile Gly Met Lys Gly Glu Arg
450                 455                 460

Arg Arg Gly Lys Gly His Asp Gly Leu Tyr Gln Gly Leu Ser Thr Ala
465                 470                 475                 480

Thr Lys Asp Thr Tyr Asp Ala Leu His Met Gln Ala Leu Pro Pro Arg
                485                 490                 495
```